United States Patent [19]
Fisher

[11] 4,088,244
[45] May 9, 1978

[54] APPARATUS FOR DE-NESTING FLANGED CONTAINERS

[76] Inventor: Samuel Fisher, 5466 Jason, Houston, Tex. 77096

[21] Appl. No.: 751,100

[22] Filed: Dec. 16, 1976

[51] Int. Cl.² ............................................. B65G 59/00
[52] U.S. Cl. .................................................. 221/299
[58] Field of Search ................ 221/238, 224, 289, 299

[56] References Cited
U.S. PATENT DOCUMENTS 3,795,344  3/1974  Falk et al. ............................ 221/299

FOREIGN PATENT DOCUMENTS 529,549  11/1940  United Kingdom ................. 221/299

Primary Examiner—Allen N. Knowles
Attorney, Agent, or Firm—Arnold, White & Durkee

[57] ABSTRACT

Apparatus for separating, or de-nesting, the lowermost flanged container from a nested stack of flanged containers is characterized by a flange support member reciprocally movable from a first to a second retilinear position. The flange support member has first and second flange support surfaces thereon, the second flange support surface being rectilinearly behind and in a vertical plane above the first flange support surface. In the first position, the first flange support surface supports the flanges of the lowermost container above an opening provided in a baseplate. As the flange support member rectilinearly displaces to the second position, a lifting surface lifts the flanges of the next-lowermost container onto the second flange support surface cotemporaneously with the withdrawal of the first flange support surface out of its supporting relationship with the flanges of the lowermost container. Thus, the flanges of the next-lowermost container are supported on the second flange support surface above the opening in the baseplate as the lowermost container passes therethrough.

12 Claims, 7 Drawing Figures

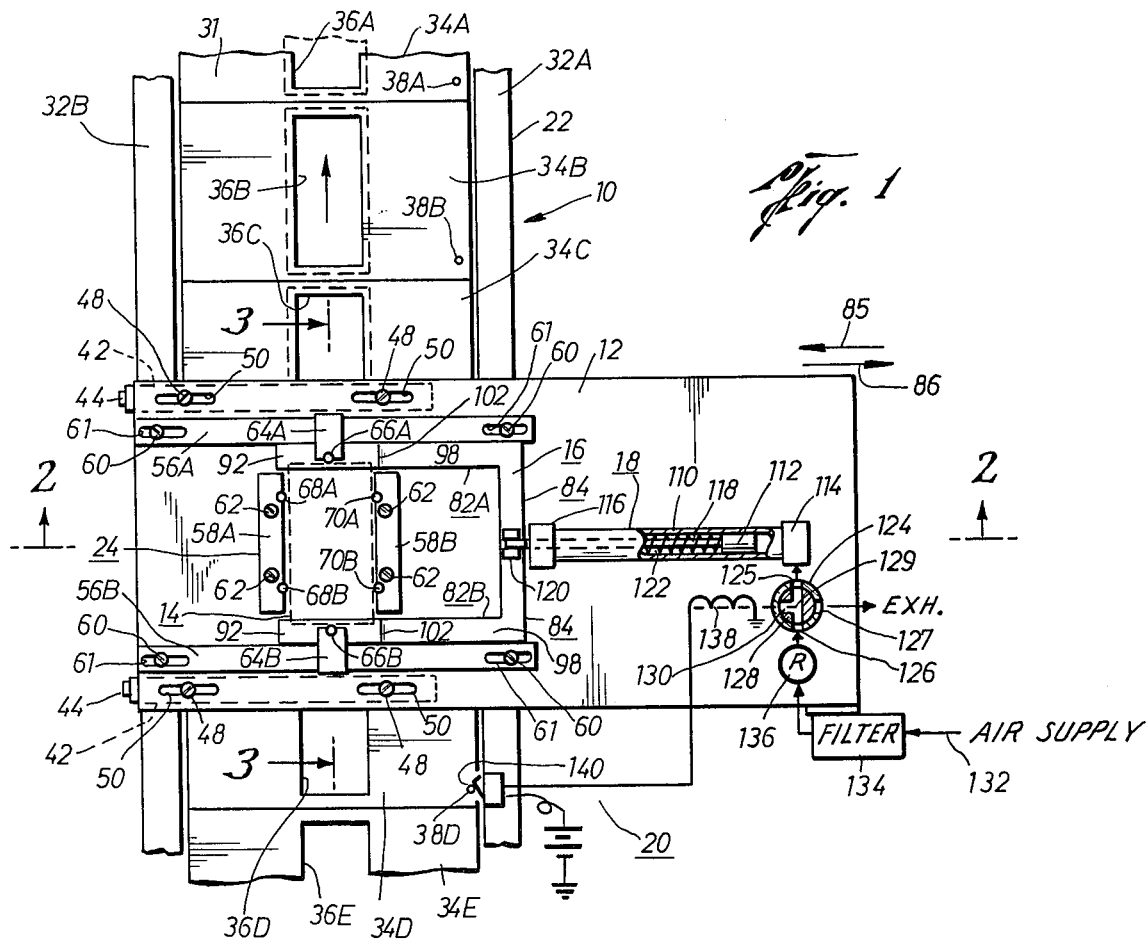
Fig. 1
Fig. 1A
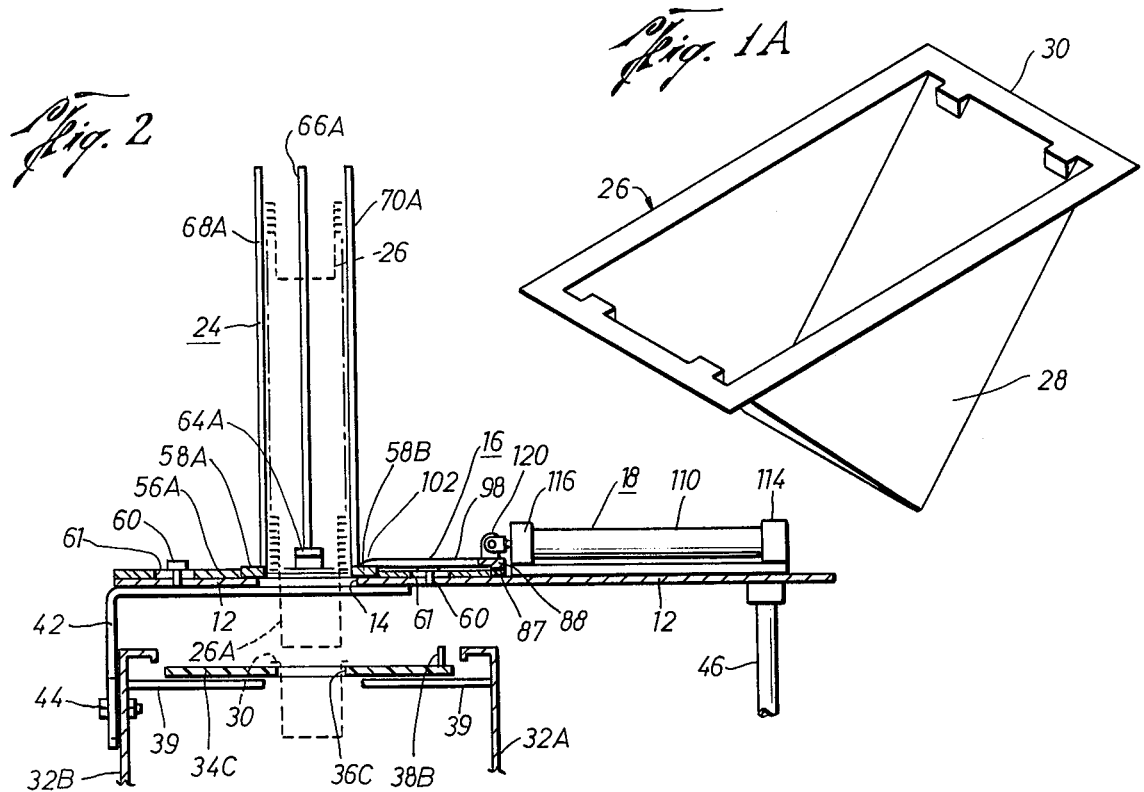
Fig. 2

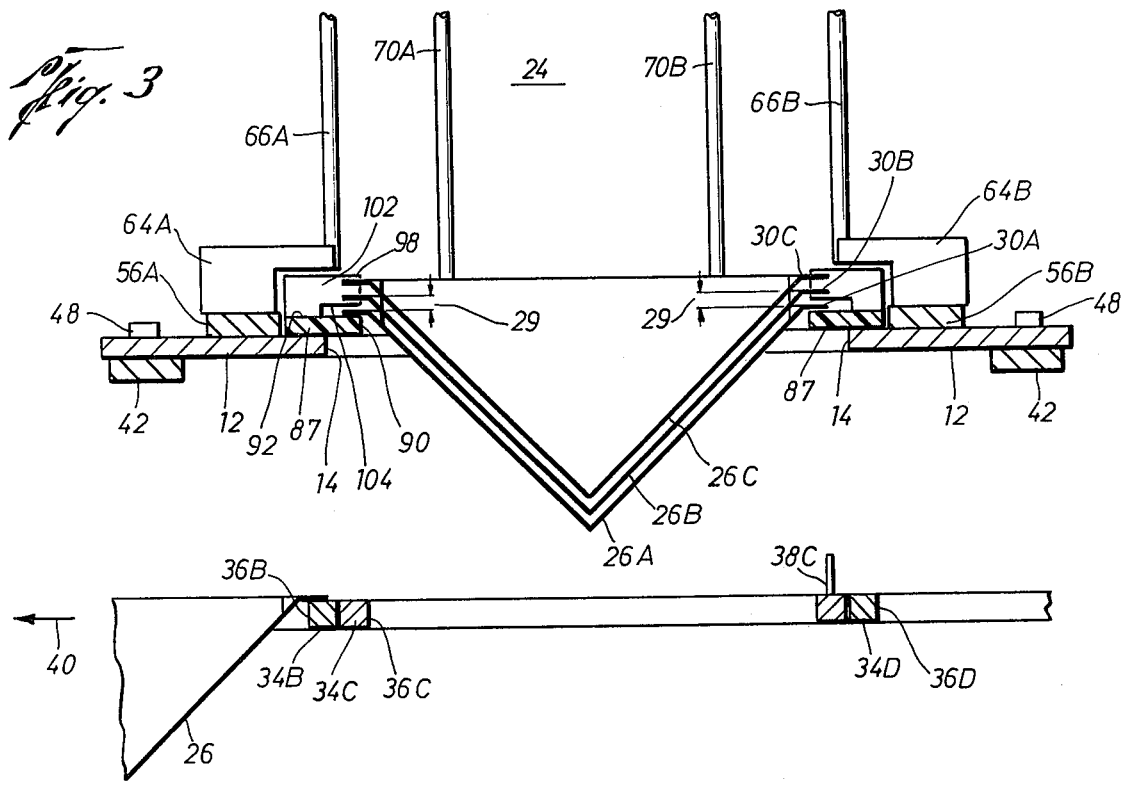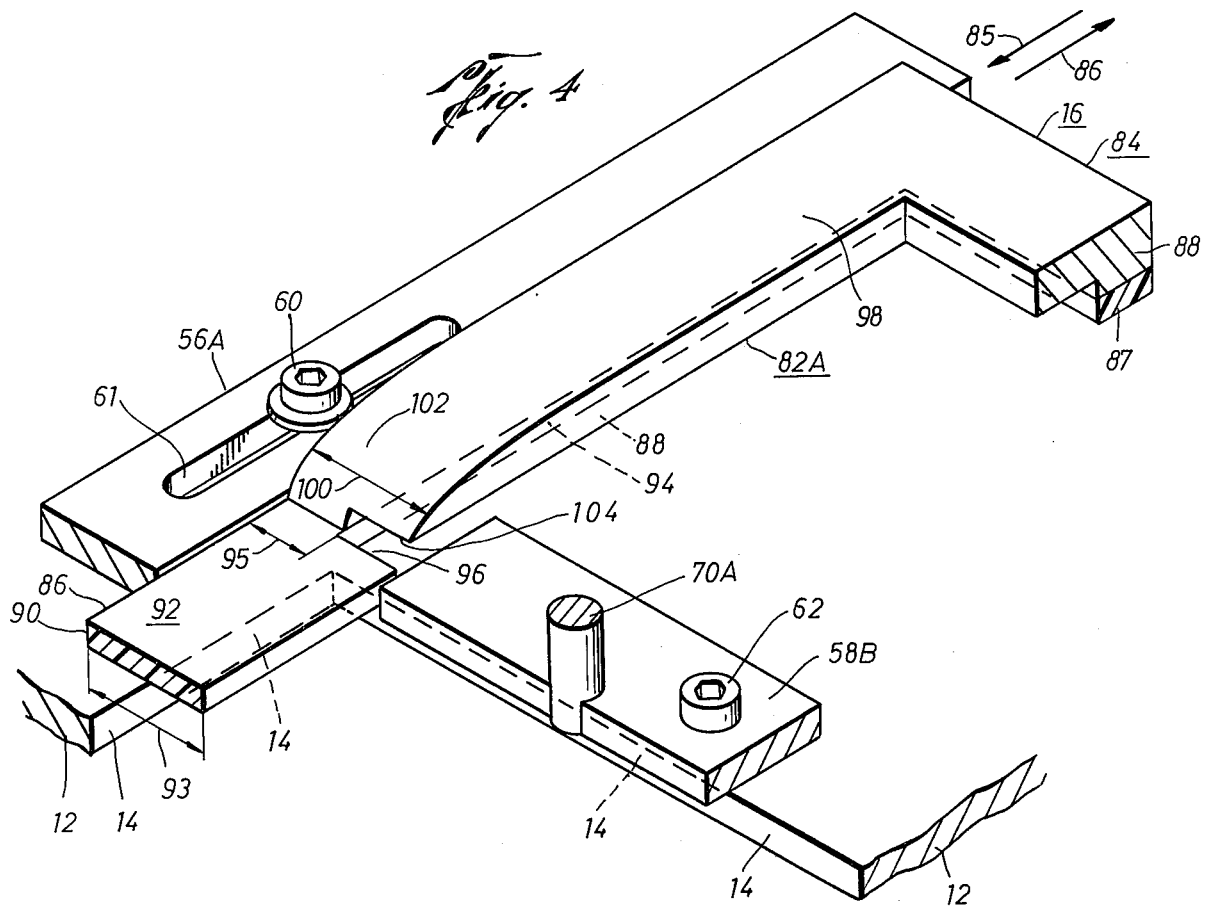

APPARATUS FOR DE-NESTING FLANGED CONTAINERS

BACKGROUND OF THE INVENTION

1. Field of the Invention

This invention relates to an apparatus for de-nesting, or separating, containers having flanged edges, and in particular, to apparatus for separating individual flanged containers from a stacked array of nested containers.

2. Background of the Invention

In the fast-food preparation industry it is common practice to package fully prepared comestible articles, such as sandwiches or the like, in clear containers fabricated of a transparent plastic or other suitable material. Such containers are usually provided with a receptacle portion which receives the prepared comestible article. Usually these containers are provided with flanged edges, or lips, which protrude outwardly beyond the basic dimension of the receptacle to receive a covering flap which seals and maintains the attractiveness and freshness of the comestible article.

The flanged containers are commonly fabricated from a sheet of suitable flexible and transparent material by extruding containers from the sheet or by punching the sheet over an appropriate die. The containers are stacked for transportation and are then shipped to the fast-food packager, usually in a nested configuration. By a nested configuration it is meant that the exterior of the receptacle portion of each container is received within the receptacle of the next-lower container. U.S. Pat. No. 2,852,157 (Frater), at FIG. 2 thereof, illustrates a side view of a plurality of flanged containers disposed in a nested configuration.

At the fast-food packaging location, it is therefore necessary to separate, or de-nest, the individual flanged containers from the nested stack. Such a de-nesting process is usually done manually as but one step in a fast-food packaging production line. Alternatively, it is known in the art to separate a stack of nested containers by periodically attaching suitable gripping members to the lowermost container and pulling that lowermost container downwardly and away from the stack. The flanged containers nested above the lowermost container are retained in place by suitable flange retainers, or inwardly directed pins. These retainers continue to suppot the remainder of the nested stack of containers by providing support beneath the flanges of the next-lowermost container in the stack as the lowermost container is pulled away therefrom.

However, this downwardly pulling motion imposed upon the lowermost container in a stack subjects the receptacle portion of that lowermost container to a possibly damaging gripping attachment likely to result in perforation or tearing. Further, the downwardly directed force imposed on the lowermost container must be sufficient to pull the flanges thereof over the inwardly directed pins, possibly subjecting those flanges to tearing or rupture. Such damage to the container is, of course, disadvantageous, since it endangers the wholesomeness and saleability of a fully packaged comestible article placed therewithin. Further, such downward pulling is wasteful in that it may not separate only the lowermost flanged container from the nested stack. Of course, this waste unduly increases the cost of preparation and packaging of the comestible articles.

In view of the foregoing, it is advantageous to provide a container de-nesting apparatus able to separate the lowermost nested container from a stacked array thereof without generating a possibility of rupture to the receptacle portion or tearing of the flanges thereof. It is of further advantage to provide a container de-nesting apparatus that alternatively supports the flanges of the lowermost container in the array from the bottom thereof yet, as that support is moved away from the flanges of the lowermost container, the remaining containers in the array are lifted upwardly from the lowermost container to permit that lowermost container to fall, due to the influence of its own weight. It is also advantageous to associate a flanged container de-nesting apparatus with suitable automated conveyors, if desired, so that the separated containers may fall into the suitable conveyor apparatus. It is of even further advantage to provide a container de-nesting apparatus wherein a support surface on the support element is reciprocally movable so that movement in a first rectilinear direction separates the lowermost container and simultaneously lifts the remaining containers of the array therefrom, while movement in an opposite rectilinear direction places the now-lowermost container onto the support surface so that the separating operation may be repeated.

SUMMARY OF THE INVENTION

This invention relates to a container de-nesting apparatus for separating the lowermost container from a nested stack of flanged containers which includes a baseplate having an opening therein of a size sufficient to permit an individual container in the nested array to pass downwardly therethrough. An upstanding reservoir arrangement, or magazine, for the nested stack of containers is provided so as to dispose that nested stack over the opening provided in the baseplate. The invention includes a reciprocally movable flange support member which is rectilinearly movable with respect to the baseplate and in relation to the opening therein from a first to a second rectilinear position. The flange support member is a substantially U-shaped member having, on each leg of the U, first and second flange support surfaces. The flange support surfaces are rectilinearly spaced with respect to each other, with the second flange support surface being spaced in a plane above and rectilinearly behind the first flange support surface. A lifting surface is provided between the first and second flange support surfaces, the lifting surface having a cutout portion therein.

In the first rectilinear position, the first flange support surface overlays a portion of the opening provided in the baseplate and supports thereon the underside of the flanges of the lowermost container in the nested array. As the flange support member moves from the first to the second rectilinear position, the first flange support surface moves out of the supporting relationship with the flanges on the lowermost container in the nested array. As the support member moves rectilinearly, the lifting member engages the flanges of the next-lowermost container in the nested array to thereby lift that next-lowermost container onto the second flange support surface to support the nested array above the opening in the baseplate.

Simultaneously with the lifting of the remaining containers in the array, the flanges on the lowermost container in the array pass through the cutout in the lifting surface as the support provided by the first flange support surface is withdrawn, resulting in the lowermost container in the array passing through the opening in the baseplate. A suitable conveyor or the like may be provided to receive the separated container. As the flange support member returns to the first position, the next-lowermost container in the array passes from its position wherein it is supported by the second flange support surface, down the lifting surface, and to a position over the opening in the baseplate where it is supported by the first flange support surface.

In this manner, the lowermost container in the array is supported in position over the opening until the remainder of the containers thereabove are lifted away and suitably supported to permit that lowermost container to drop into by its own weight to a suitable conveyor. Means are provided for reciprocally and rectilinearly moving the flange support member, the means being conveniently attached to the closed leg of the U-shaped member. Further, synchronization means operatively associated with the reciprocating means may be provided to synchronize the rectilinear movement of the support member to permit the containers in the nested array to fall into appropriately sized openings in a suitable conveyor element.

BRIEF DESCRIPTION OF THE DRAWINGS

The invention will be more fully understood from the following detailed description of a preferred embodiment thereof, taken in connection with the accompanying drawings, in which:

FIG. 1 is a plan view of a container de-nesting apparatus embodying the teachings of this invention with the first flange support surface shown in next-adjacency to the opening in the baseplate;

FIG. 1A is an isolated perspective view of an individual nestable container with flanges thereon adapted to be separated by an apparatus embodying the teachings of this invention;

FIG. 2 is a view taken along section lines 2—2 of FIG. 1;

FIG. 3 is a view taken along section lines 3—3 of FIG. 1, being substantially transverse to the view shown in FIG. 2;

FIG. 4 is an isolated perspective view of a portion of the flange support member embodying the teachings of this invention;

DESCRIPTION OF THE PREFERRED EMBODIMENT

Figure 5:
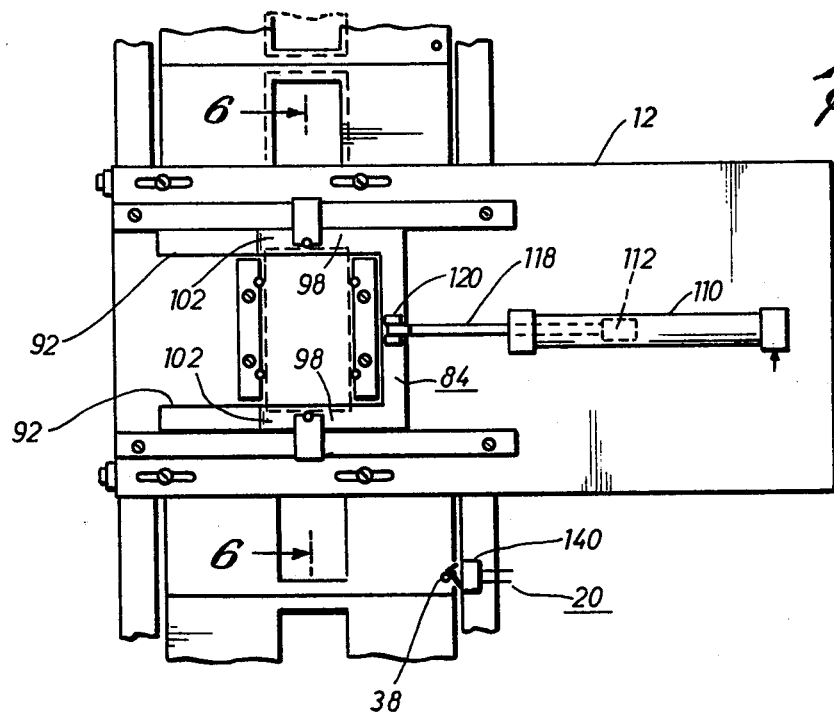
FIG. 5 is a plan view similar to FIG. 1, in which the second flange support surface is shown in next-adjacency to the opening in the baseplate; and, FIG. 6 is a sectional view taken along lines 6—6 of FIG. 5 and substantially similar to the view of FIG. 3.

Throughout the following description similar reference numerals refer to similar elements in all figures of the drawings.

Referring first to FIG. 1, a plan view of a container de-nesting apparatus 10 embodying the teachings of this invention is shown. In general, the container de-nesting apparatus 10 comprises a baseplate 12 having an opening 14 therein, the opening 14 being of a sufficient dimension so as to permit a flanged container to pass unobstructedly therethrough. A flange support member, generally indicated by reference numeral 16, for alternately supporting a lowermost and a next-lowermost flanged container, is provided. The flange support member 16 is reciprocally and rectilinearly movable from a first rectilinear position (shown in FIGS. 1-4) to a second rectilinear position (shown in FIGS. 5-6). Suitable means, generally indicated by reference numeral 18, for reciprocating the flange support member 16 is provided. Control means, generally indicated by reference numeral 20, for controlling the reciprocation of the support member 16 in accordance with a moving container conveyor apparatus 22 may also be provided in cooperative assocation with the reciprocating means 20. Further, the apparatus 10 generally includes magazine means 24 for maintaining a nested array or stack of containers in position substantially over the opening 14 provided in the baseplate 12.

Referring to FIG. 1A, an isolated perspective view of a container 26 for a comestible product is shown. The container 26 includes a receptacle portion 28 terminating in an outwardly extending flange 30. As seen in FIG. 1A, the receptacle portion 28 is substantially triangular and defines therewithin a triangular volume able to receive the diagonally cut halves of a prepared sandwich. The flange 30 lies above the triangular receptacle 28 and provides a suitable surface on which a sealing material, such as a gummed flap, may be affixed. The container 26 is fabricated of any suitable transparent plastic material in a manner known to those skilled in the art. As is appreciated by those with skill in the art, the containers 26 are received from a container manufacturer or fabricator with the individual containers 26 being provided in a vertically nested or stacked configuration, each of the receptical portions 28 of the individual containers 26 being nested within the receptical portion 28 of the next-lower container. The flanges 30 of the individual containers so-nested are substantially vertically above the other, and define a vertical clearance 29 therebetween. It is understood that apparatus embodying the teachings of this invention may be utilized to separate any suitably configured flanged container, without regard to the shape of the receptacle portion thereof. It is also apparent, to those with skill in the art, that the de-nesting apparatus embodying the teachings of this invention is adaptable to separate the nested array of containers 26 maintained in position in the magazine 24 over the opening 14.

Referring now to FIGS. 1, 2 and 3, views of the container de-nesting apparatus 10 embodying the teachings of this invention are shown with the flange support member 16 in the first rectilinear position and partially illustrating the conveyor means 22. As seen in FIG. 1, the conveyor means 22 comprises a substantially endless belt 31 supported between sidewalls 32A and 32B is an manner known to those skilled in the art. The endless belt 31 includes a plurality of segments 34A through 34F connected in an end-to-end relation. Each segment 34 is provided with an opening 36 therein, the opening 36 being conformable in shape to the cross section area across the top of the individual containers 26 and being sized so as to receive therewithin only the receptical portions 28 thereof. As illustrated in dot-dash lines in FIG. 1, the periphery of each of the openings 36 in the conveyor segments 34 are sized to support thereon the flange portion 30 of the containers 26. For a purpose to be explained more fully herein, each segment 34 of the conveyor 22 is provided with a substantially upstanding post 38. The conveyor 22 is movable along guideplates 39 (FIG. 2) by suitable drive means (not shown) in an axial direction indicated by reference arrow 40.

One convenient construction for the de-nesting apparatus 10 when used in connection with the conveyor 22 includes the baseplate 12 disposed on suitable brackets 42 above the sidewalls 32. As shown in FIG. 2, the baseplate 12 is supported above the conveyor sidewall 32B by the bracket 42 and by suitable attachment means, such as bolts 44. The opposite end of the baseplate 12 is secured to insure substantial parallelism between the planar surface of the baseplate 12 and the surface of the conveyor 22 by a support 46. The baseplate 12 is adjustable with respect to the top of the bracket 42 by means of upstanding pins 48 on the bracket 42 being received within slots 50 in the baseplate 12.

As best seen in FIG. 3, the baseplate 12 has an opening 14 therein, the opening of 14 being of a dimension sufficient to permit an individual container 26, including the outwardly extending dimension of the flange 30 thereof, to pass unobstructedly through the opening 14.

Mounted on the surface of the baseplate 12 in fixed relationship therewith is the magazine means 24 for holding the array of nested containers 26 above the opening 14 within the baseplate 12. The means 24 include pairs of parallel, opposed bumpers 56A and 56B and 58A and 58B. The bumpers 56 (FIGS. 1 through 4) are adjustable with respect to the baseplate 12 by the engagement of suitable means, such as bolts 60, (which are threaded into the baseplate 12) engaging slots 61 provided in the bumpers 56. The bumpers 58 (FIGS. 1, 2, and 4) are secured to the baseplate 12 by suitable means, such as bolts 62. Mounted atop the bumpers 56 are brackets 64A and 64B (FIGS. 1, 2, and 3). The brackets 64A and 64b respectively support parallel, upstanding posts 66A and 66B. Upstanding posts 68A and 68B and 70A and 70B are paired and supported, respectively, from bumpers 58A and 58B. The posts 66, 68, and 70 cooperate to define the magazine means 24 which maintains the nested stack of containers 26 in position with respect to the opening 14 extending through baseplate 12.

The flange support member 16 is a substantially U-shaped member having first and second substantially parallel legs 82A and 82B. The back ends of the legs 82 are connected by a suitable crosspiece 84 which defines the closed bottom portion of the U-shaped flange support member 16. The flange support member 16 is rectilinearly movable in first and second opposed rectilinear directions, as respectively indicated by reference arrows 85 and 86. As best seen in FIG. 4, the legs 82 of the flange support member 16 are guided by the bumpers 56 and 58, which cooperate to define a guide channel on the surface of the baseplate 12 through which the flange support member 16 is rectilinearly movable.

With further reference to FIG. 4, an expanded perspective view of one leg 82A of the flange member partially cut away in section as shown. There illustrated is a convenient construction for a flange support member 16 embodying the teachings of this invention. The flange support member 16 is shown as including a bottom, or lower, U-shaped member 87 fabricated of nylon or other suitable wear-resistant and easily disinfected material. Stacked above the lower U-shaped member 87 is an upper U-shaped member 88. The legs of the upper member 88 extend forwardly from the closed portion thereof for a lesser distance than do the legs of the lower U-shaped member 87. The members 87 and 88 may be connected together by any suitable attachment means in any convenient manner known to one skilled in the art.

Each end of the forwardly extending legs of the lower U-shaped member 87 includes an enlarged portion 90 defining thereon a first planar flange support surface 92. The first flange support suface 92 has a predetermined width dimension, as defined by reference numeral 93. The rearward portion 94 of each leg of the lower U-shaped member 87 is of a reduced width dimension, illustrated by reference numeral 95, when compared to the width dimension 93 of the first flange support surface 92. The reduced dimension portion 94 is defined by the cut-in step 96 abruptly changing the width of the forward to rear portions of the legs of the lower U-shaped member 87. It may be observed with reference to FIG. 4 that the first flange support surface 92, having the predetermined width dimension 93, when in next-adjacency to the opening 14 in the baseplate 12, overlies a portion of the opening 14 to effectively limit the surface area of the opening 14 presented to objects above the plane including the first flange support surface 92. Further, it may be seen that the rearward reduced width portion 94 of the lower U-shaped member 87 has a width dimension 95 such that the edge of the reduced portion 94 runs substantially coincident with the opening 14 in the baseplate 12. Thus, it may be appreciated that when the rearward, reduced-width portion 94 is in next-adjacency to the opening 14, the full effective area of the opening 14 is presented or exposed to objects lying in the plane which includes the first flange support surface 92.

The upper U-shaped member 88 defines a second flange support surface 98 thereon. The second flange support surface 98 is a substantially planar surface extending substantially parallel to the planar surface of the first flange support surface 92. The second flange support surface 98 is spaced rearwardly (in the rectilinear direction 88) and in a plane above the plane containing the first flange support surface 92. It is, of course, understood that any construction of the flange support member 16 may be utilized so long as a second planar flange support surface is spaced rectilinearly behind and vertically above the planar surface of the first flange support surface 92.

As illustrated in FIG. 4, the second flange support surface 98 has a predetermined width dimension 100 (defined in the same manner as the width dimensions 93 and 95) with the dimension 100 being substantially equal to the dimension 93. A curved transition, or lifting, surface 102 is disposed intermediate between and connects the first and the second flange support surfaces 92 and 98, respectively. A cut-out section 104 is provided in the lifting surface 102, the cut-out being substantially directly above the cut-in step portion 96 in the lower U-shaped member 87.

It may therefore be appreciated that in the preferred embodiment of the invention, the upper U-shaped member 88 and the second flange support surface 98 thereon is fixedly disposed substantially above the reduced width, rearward portion 94 of the lower U-shaped member 87. It may also be appreciated, due to the described assembled relationship of the apparatus, when the rearward portion 94 of the lower U-shaped member 87 is in next-adjacency to the opening 14 in the baseplate 12, the second flange support surface 98 having the wider width dimension 100 (as compared to the width dimension 95) overlies a portion of the opening 14. Thus, the full effective surface area of the opening 14 is presented within the plane including the first flange support surface 92 while a reduced effective surface area of the opening 14 is presented to objects lying in or above the plane containing the second flange support surface 98. The simultaneous exposure of the full and reduced effective areas of the opening 14 in vertically spaced planes occurs while the rearward portion 94 of the lower U-shaped member 37 and the second flange support surface 98 on the upper U-shaped member 88 are cotemporaneously in next-adjacency to the opening 14.

The means generally indicated by reference numeral 18 (FIG. 1) for reciprocating the flange support member 16 in the first and second rectilinear directions 85 and 86, respectively, are suitably affixed to the baseplate 12. The means 18 conveniently include a piston 110 having a cylinder 112 movable therewithin. First and second end caps 114 and 116 are respectively provided. A piston rod 118 extends centrally and axially through the interior of the piston 110 and extends through the second end cap 116 for attachment to a suitable mounting bracket 120 provided on the closed end 84 of the substantially U-shaped flange support member 16. A spring 122 is disposed within the cylinder 110 so as to bias the piston 112 toward the first end cap 114 in the second rectilinear direction 86.

The first end cap 114 communicates with a three-way check valve 124. The valve 124 includes a casing having ports 125, 126, and 127 therein. Rotatably disposed within the valve casing is a valve element 128 having a T-shaped channel with passages 129 and 130 therein. The port 125 is connected through a suitable pressure-tight connection to the first end cap 114 of the cylinder 110 while the port 126 is connected to an air supply 132 through an air filter 134 and a pressure regulator 136. A solenoid 138 is connected to the valve element 128 of the three-way check valve 124 so that when the solenoid 138 is energized, pressurized fluid from the supply 132 enters the cylinder 110 through aligned the ports 125 and 126 in the valve casing and the passage 129 in the valve element 128. The pressurization of the cylinder 110 moves the piston 112 against the bias of the spring 122 in the first rectilinear direction 86 to thereby rectilinearly displace the flange support member 16 from the first rectilinear position (shown in FIGS. 1–4) to the second rectilinear position (shown in FIGS. 5 and 6) in a manner to be more fully explained herein. It is of course understood that any suitable reciprocating arrangement to displace the flange support member 16 from the first to the second rectilinear position is within the contemplation of this invention. The reciprocating means 18 may be actuated to rectilinearly displace the flange support member 16 irrespective of cooperative association with a conveyor 31.

When the solenoid 138 is de-energized, the valve element 128 rotates within the valve casing to permit the port 125 to communicate with the port 127 through the passages 129 and 130 and, the pressurized fluid is thus withdrawn from the cylinder 110. With the fluid withdrawn from the cylinder 110, the force of the bias spring 122 becomes dominant and urges the piston 118 toward the first end cap 114 in the second rectilinear direction 88 to again move the flange support member 16 from the second to the first rectilinear position.

The control means 20, which control the reciprocation of the flange support member 16 by cooperative association with the reciprocating means 18, are provided to synchronize the rectilinear movement of the flange support member 16 with the conveyor element 31. The means 20 generally include an outwardly biased switch 140 extending into the path of the posts 38 mounted on the conveyor 31. One side of the switch 140 is connected to a suitable source of electrical potential while the second side is connected to the solenoid 138. Of course, any suitable means may be utilized to actuate the reciprocating means 16 or to synchronize the movement of the flange support member 16 with a conveyor 31 if the conveyor 31 is desired to be used in cooperative association with the apparatus 10. As may be appreciated, each post 38 on the conveyor segments 34 successively interacts with the switch 140 so as to alternatively close the switch 140 to activate and deactivate the solenoid 138 of the reciprocating means 18.

OPERATION

Having defined the structural elements of the apparatus embodying the teachings of this invention, the operation of the apparatus 10 is now discussed.

Figure 6:
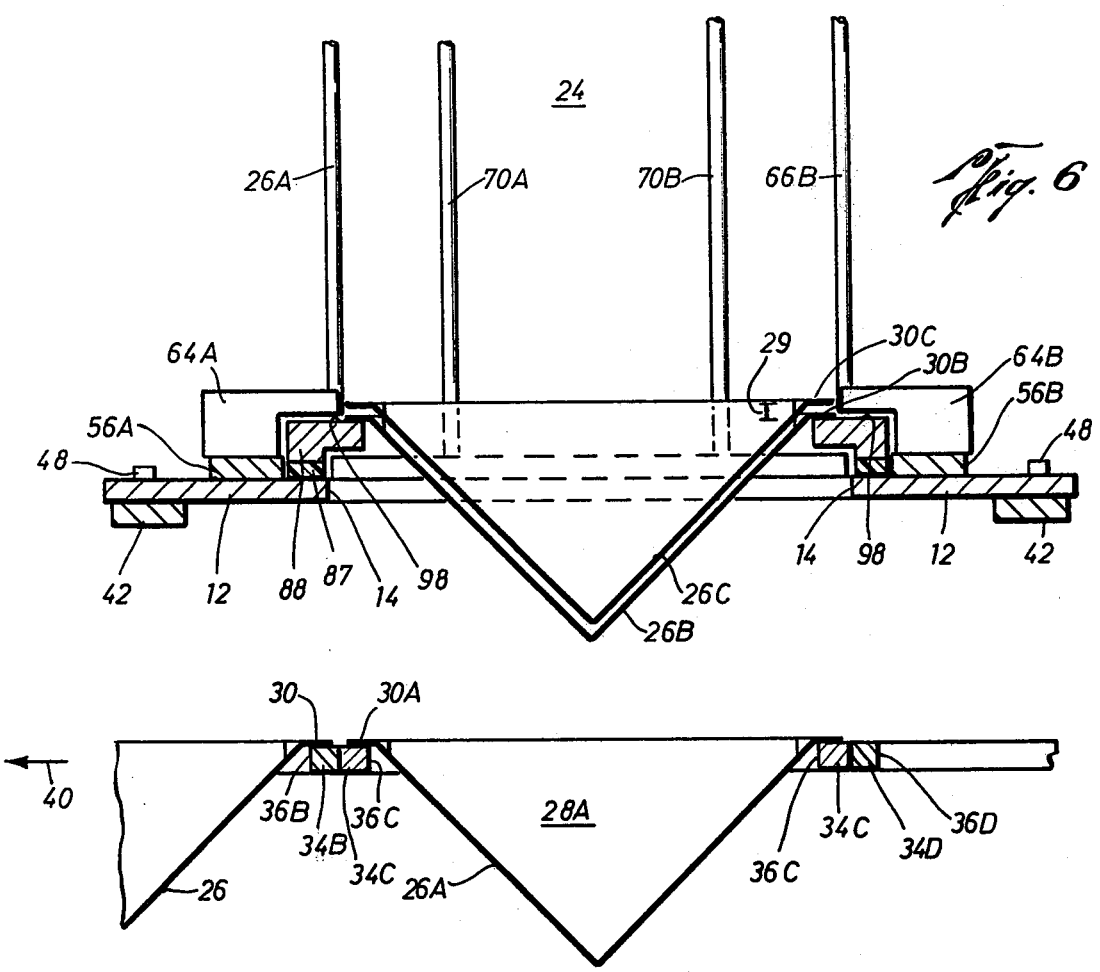

The flange support member 16 is rectilinearly movable with respect to the baseplate 12 and the opening 14 therein from a first rectilinear position (shown in FIGS. 1–4) to a second rectilinear position (shown in FIGS. 5 and 6). In the first rectilinear position the first flange support surface 92 is disposed in next-adjacency to the opening 14 in the baseplate 12. Due to the overlying of the first flange support surface 92, the effective area of the opening 14 in the baseplate 12 is reduced such that the lowermost flanged container 26A within the magazine 24 is unable to pass therethrough.

In the second rectilinear position the first flange support surface is rectilinearly displaced with respect to the opening 14 and the second flange support surface 98 is in next-adjacency to the opening 14 in the baseplate 12. Necessarily, due to the construction of the flange support member 16, when the second flange support surface 98 is in next-adjacency to the opening 14, the rearward, reduced width portion 94 disposed beneath the second flange support surface 98 is also in next-adjacency to the opening 114 in the baseplate 12. Thus, in the second rectilinear position, the effective area of the opening 14 is reduced due to the overlaying there by the second flange support surface 98. However, cotemporaneously in the plane including the first surface 92, due to the next-adjacency of reduced width rearward portion 94 to the opening 14, the full effective area of the opening 14 is presented.

As seen in connection with FIGS. 3 and 4, with the flange support member 16 in the first rectilinear position, the first flange support surface 92 acts to support the flanges 30A of the lowermost nested container 26A. Since the effective surface of the opening 14 is reduced by the first flange support surface 92, the lowermost container 26A is prevented from passing through the opening 14 and therefore prevented from being received within the opening 36C in the conveyor segment 34C passing in synchronization therebeneath.

In response to the interaction between the upstanding posts 38 and the switch 140, the actuating means 18 displaces the flange support member 16 from the first to the second rectilinear position. (Any suitable arrangement may be provided so that either the post 38 on the segment 34 of the conveyor which is to receive the separated container, or any other post, may actuate the solenoid 138).

As the flange support member 16 is moved from the first toward the second rectilinear position, the lifting surface 102 between the first flange support surface 92 and the second flange support surface 98 enters the vertical space 29 (FIG. 3) between the flanges 30A and 30B of the nested stack of containers to thereby lift the flanges 30B of the next-lowermost container 26B into a supported relationship on the second flange support surface 98.

However, it is noted that the flanges 30A of the lowermost nested container 26A pass through the cutout portion 104 in the lifting surface 102 as the flange support member 16 moves from the first to the second position. Thus, in the second position (FIGS. 5 and 6), the flanges 30B of the next-lowermost nested container 26B, and all containers nested therewithin and thereabove, are vertically lifted within the magazine 24 and supported above the opening 14 in the baseplate 12 and prevented from passing therethrough (FIG. 6). However, since the reduced portion 95 is moving into next-adjacency to the opening 14 while the flange support member 16 is moving to the second rectilinear position, the first flange support surface 92 supporting the flanges 30A on the lowermost container 26A is withdrawn. Therefore, the container 26A is permitted to pass by its own weight through the opening 14 in the baseplate 12 and is received within the opening 36C in the conveyor segment 34C passing therebeneath (FIG. 6).

Upon deactuation of the actuating means 18, pressurized fluid then within the cylinder 110 is permitted to exit through the ports 125 and 126 as described above, and the flange support 16 is returned in the second rectilinear direction 86 and reestablishes the first rectilinear position with respect to the opening 14. As the flange support member 16 returns to the first rectilinear position, the magazine 24 prevents relative displacement of the stack of nested containers, thus the next-lowermost container 26B becomes the new lowermost container in the stacked array so that the separating process may be repeated.

It may thus be appreciated that a device for separating the lowermost flange container from a nested stack of flanged containers is provided by apparatus embodying the teachings of this invention. It is, of course, understood that any suitable construction for the flange support member 16, and for the reciprocating means 18, may be utilized and still remain within the contemplation of this invention. Further, it is understood that the container de-nesting apparatus herein described need not be utilized in connection with a conveyor element passing therebeneath and need not be synchronized therewith through the provision of the means 20 as described herein. Any suitable container-receiving member, even the hand of a manual laborer if desired, may receive the lowermost container as it is separated from the nested array.

What is claimed is:

1. Apparatus for separating the lowermost flanged container from a nested stack of flanged containers, said apparatus comprising:
    a baseplate having an opening therein sized to permit the lowermost container to pass therethrough;
    a flange support member rectilinearly movable from a first to a second position, said flange support member having first and second rectilinearly spaced flange support surfaces thereon, said second flange support surface being rectilinearly behind and above said first flange support surface, a flange-lifting surface disposed intermediate said first and said second flange support surfaces; and,
    means for rectilinearly reciprocating said flange support member from said first to said second rectilinear position;
    said flange support member in said first rectilinear position disposing said first flange support surface in adjacency to said opening in said baseplate and in a supporting relationship with respect to the flanges of the lowermost container;
    said flange support member in said second rectilinear position disposing said second flange support surface in adjacency to said opening in said baseplate;
    said lifting surface engaging the flanges on the next-lowermost container as said flange support member moves from said first to said second rectilinear position to lift the next-lowermost container onto said second flange support surface and into a supported relationship therewith as said first flange support surface is withdrawn from its supporting relationship with respect to the flanges on the lowermost container.

2. Apparatus according to claim 1,
    wherein said flange support member is a substantially U-shaped member, and wherein a first and a second flange support surface is disposed on each leg of said U-shaped member, each of said second flange support surfaces being rectilinearly behind and spaced above said first flange support surfaces.

3. Apparatus according to claim 2
    wherein said reciprocating means comprises a piston-cylinder arrangement mounted on said baseplate and connected to the closed portion of said U-shaped member.

4. Apparatus according to claim 2, wherein
    said flange support member includes a lower and an upper U-shaped member rigidly affixed one to the other, the ends of the lower U-shaped member extending forwardly from the closed portion thereof for a distance greater than the distance that the ends of the upper U-shaped member extend from the closed portion thereof,
    a substantially planar surface of a first predetermined width being disposed adjacent the ends of said lower U-shaped member defining said first flange support surfaces,
    reduced width portions of said lower U-shaped member being disposed between the first flange support surfaces and the closed portion thereof,
    a substantially planar surface of a second predetermined width substantially equal to said first predetermined width being disposed adjacent the ends of said upper U-shaped member defining said second flange support surfaces,
    said second flange support surfaces being disposed above said reduced width portions of said lower U-shaped member.

5. Apparatus according to claim 2,
    wherein a flange lifting surface is disposed between said first and said second flange support surfaces on each leg of said U-shaped member, said lifting surface having a cut-out portion therein.

6. In cooperation with a conveyor element, apparatus for separating the lowermost flange container from a nested stack of flanged containers to permit said lowermost container to be received by said conveyor, said apparatus comprising:
    a baseplate having an opening therein sized to permit the lowermost container to pass therethrough;

a flange support member rectilinearly movable from a first to a second position, said flange support member having first and second rectilinearly spaced flange support surfaces thereon, said second flange support surface being rectilinearly behind and above said first flange support surface, a flange-lifting surface disposed intermediate said first and said second flange support surfaces; and, means for rectilinearly reciprocating said flange support member from said first to said second rectilinear position;

said flange support member in said first rectilinear position disposing said first flange support surface in adjacency to said opening in said baseplate and in a supporting relationship with respect to the flanges of the lowermost container;

said flange support member in said second rectilinear position disposing said second flange support surface in adjacency to said opening in said baseplate;

said lifting surface engaging the flanges on the next-lowermost container as said flange support member moves from said first to said second rectilinear position to lift the next-lowermost container onto said second flange support surface and into a supported relationship therewith as said first flange support surface is withdrawn from its supporting relationship with respect to the flanges on the lowermost container.

7. Apparatus according to claim 6 further comprising means for actuating the reciprocating means in predetermined synchronization with respect to said conveyor.

8. Apparatus according to claim 7 wherein said means comprise upstanding posts on said conveyor, each periodically cooperating with said reciprocating means for actuation thereof.

9. Apparatus according to claim 6,
wherein said flange support member is a substantially U-shaped member, and wherein a first and a second flange support surface is disposed on each leg of said U-shaped member, each of said second flange support surfaces being rectilinearly behind and spaced above said first flange support surfaces.

10. Apparatus according to claim 6
wherein the reciprocating means comprises a piston-cylinder arrangement mounted on said baseplate and connected to the closed portion of said U-shaped member.

11. Apparatus according to claim 6, wherein
said flange support member includes a lower and an upper U-shaped member rigidly affixed one to the other, the ends of the lower U-shaped member extending forwardly from the closed portion thereof for a distance greater than the distance that the ends of the upper U-shaped member extend from the closed portion thereof, a substantially planar surface of a first predetermined width being disposed adjacent the ends of said lower U-shaped member defining said first flange support surfaces, reduced width portions of said lower U-shaped member being disposed between the first flange support surfaces and the closed portion thereof, a substantially planar surface of a second predetermined width substantially equal to said first predetermined width being disposed adjacent the ends of said upper U-shaped member defining said second flange support surfaces, said second flange support surfaces being disposed above said reduced width portions of said lower U-shaped member.

12. Apparatus according to claim 6,
wherein a flange lifting surface is disposed between said first and said second flange support surfaces on each leg of said U-shaped member, said lifting surface having a cut-out portion therein.

* * * * *